United States Patent
Abuelsaad et al.

(10) Patent No.: US 9,569,815 B1
(45) Date of Patent: Feb. 14, 2017

(54) OPTIMIZING ELECTRONIC DISPLAY RESOLUTION

(71) Applicant: INTERNATIONAL BUSINESS MACHINES CORPORATION, Armonk, NY (US)

(72) Inventors: Tamer E. Abuelsaad, Somers, NY (US); Gregory J. Boss, Saginaw, MI (US); John E. Moore, Jr., Brownsburg, IN (US); Randy A. Rendahl, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/940,459

(22) Filed: Nov. 13, 2015

(51) Int. Cl.
*G06T 3/40* (2006.01)
*G06F 3/01* (2006.01)

(52) U.S. Cl.
CPC ........... *G06T 3/40* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 7,975,283 B2 | 7/2011 | Bedingfield, Sr. | |
| 8,427,476 B2 | 4/2013 | Chen et al. | |
| 9,280,452 B1* | 3/2016 | Mahadevan | ........ G06F 11/3684 |
| 2001/0002833 A1* | 6/2001 | Narui | .................. G06F 3/04897 345/418 |
| 2007/0070094 A1* | 3/2007 | Lim | ........................ G06F 3/14 345/698 |
| 2011/0141114 A1* | 6/2011 | Chen | ....................... G06F 3/012 345/428 |
| 2011/0148930 A1* | 6/2011 | Lee | ..................... G06F 3/04897 345/660 |
| 2012/0154277 A1* | 6/2012 | Bar-Zeev | ............. G02B 27/017 345/158 |
| 2012/0206559 A1* | 8/2012 | Lin | ..................... H04L 12/1827 348/14.08 |

(Continued)

OTHER PUBLICATIONS

Jansen, Kid, "Visual Acuity, The Sense and Non-sense of Ultra High Definition Displays", TFT Central, http://www.tftcentral.co.uk/articles/visual_acuity.htm; Aug. 27, 2014, 1 page.
Morrison et al., "Why Ultra HD 4K TVs are Still Stupid", CNET, http://www.cnet.com/news/why-ultra-hd-4k-tvs-are-still-stupid/, Jan. 28, 2013, 10 pages.

(Continued)

*Primary Examiner* — Xiao Wu
*Assistant Examiner* — Yu Chen
(74) *Attorney, Agent, or Firm* — Lisa Ulrich; Andrew D. Wright; Roberts Mlotkowski Safran Cole & Calderon, P.C.

(57) ABSTRACT

Systems and methods for optimizing resolution of an electronic display device are disclosed. A computer program product for optimizing display resolution of an electronic device includes a computer readable storage medium having program instructions embodied therewith. The program instructions are executable by a computing device to cause the computing device to: detect the presence of at least one user; determine an identity of the at least one user; obtain, from a user data storage module, personalized optimal resolution data of the at least one user; and adjust the resolution of the electronic device display based on the personalized optimal resolution data.

16 Claims, 6 Drawing Sheets

(56) References Cited

U.S. PATENT DOCUMENTS

| | | | |
|---|---|---|---|
| 2012/0262477 A1* | 10/2012 | Buchheit | G09G 5/00 345/619 |
| 2014/0022159 A1 | 1/2014 | Leigh et al. | |
| 2014/0118240 A1 | 5/2014 | Pais | |
| 2014/0237079 A1 | 8/2014 | Lockerbie et al. | |
| 2015/0036999 A1 | 2/2015 | Batur et al. | |
| 2015/0213786 A1* | 7/2015 | Mamajiwala | G09G 5/391 345/428 |
| 2016/0078594 A1* | 3/2016 | Scherlen | G09G 5/00 345/428 |

OTHER PUBLICATIONS

Wikipedia, "Optimum HDTV Viewing Distance", Wikipedia, https://en.wikipedia.org/wiki/Optimum_HDTV_viewing_distance, Accessed Jul. 24, 2015, 12 pages.

Spangler, Todd, "Netflix Remains King of Bandwidth Usage, While YouTube Declines", http://variety.com/2014/digital/news/netflix-youtube-bandwidth-usage-1201179643/, Variety, May 14, 2014, 4 pages.

Solsman, Joan E., "Netflix, YouTube Gobble up Half of Internet Traffic", http://www.cnet.com/news/netflix-youtube-gobble-up-half-of-internet-traffic/, Netflix, Nov. 11, 2013, 2 pages.

Powell, "Your Screen: How Big Should it Be?", http://www.projectorcentral.com/screen_size.htm, May 11, 2007; 2 Pages.

"List of IBM Patents or Patent Applications Treated as Related" 1 page.

U.S. Appl. No. 15/278,711, filed Sep. 28, 2016.

\* cited by examiner

OPTIMIZING ELECTRONIC DISPLAY RESOLUTION

BACKGROUND

The present invention relates generally to a computer-based display resolution configuration, and, more particularly, to methods and systems for optimizing electronic display resolutions.

Media streaming makes up a large part of Internet traffic. Media on the Internet is usually available in a variety of pixel (p) qualities (480p, 720p, 1080p, etc.). User's may invest in high resolution media devices, such as 1080p or 4K (4000p) televisions, in the hopes that they can have a better digital experience. Higher display resolutions may require a large amount of data to represent the number of pixels of an image. Transferring the large amount of data may utilize a significant portion of the available bandwidth from a server to the electronic device. Moreover, other network traffic may impede the transfer of data to the electronic device. When a user has a high resolution device, their media software will opt for using the highest resolution possible. Likewise, when adjusting manual settings, users tend to opt for the highest streaming quality. However, research has shown that viewing media streams at higher resolutions can become unnecessary depending on the distance a user is from the display. That is, the difference in quality discernible by the human eye may stop short of the highest possible resolution of a device. The viewing distance of a user plays a major role in the quality difference discernible by the human eye.

Certain industry trends are likely to lead to a situation where users must pay for their data consumption, rather than paying for bandwidth, like a utility. Should this happen, a user's use of unnecessarily high resolution settings will lead to wasteful and expensive consumption of unnecessary data. Further, a processor of an image rendering electronic device may experience slow-downs and higher power consumption as a result of processing large amounts of data associated with the streaming of unnecessarily high resolution data.

SUMMARY

In an aspect of the invention, there is a computer program product for optimizing display resolution of an electronic device, the computer program product comprising a computer readable storage medium having program instructions embodied therewith. The program instructions are executable by a computing device to cause the computing device to: detect the presence of at least one user; determine an identity of the at least one user; obtain, from a user data storage module, personalized optimal resolution data of the at least one user; and adjust the resolution of the electronic device display based on the personalized optimal resolution data.

In another aspect of the invention, a computer-implemented method includes: implementing a test sequence to determine optimal resolution of an electronic device display including: displaying an image to a user on the electronic device display at a first resolution; displaying the image to the user on the electronic device display at a second resolution different from the first resolution; and gathering user preference data regarding the first resolution and the second resolution to determine a personalized optimal resolution for a particular location.

In another aspect of the invention, there is a system for optimizing display resolution of an electronic device. The system includes a CPU, a computer readable memory and a computer readable storage medium associated with a computing device. The system also includes program instructions to determine a personalized optimal resolution of a user; to detect the presence of the user; and to adjust the resolution of the electronic device display based on the personalize optimal visual resolution of the user. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
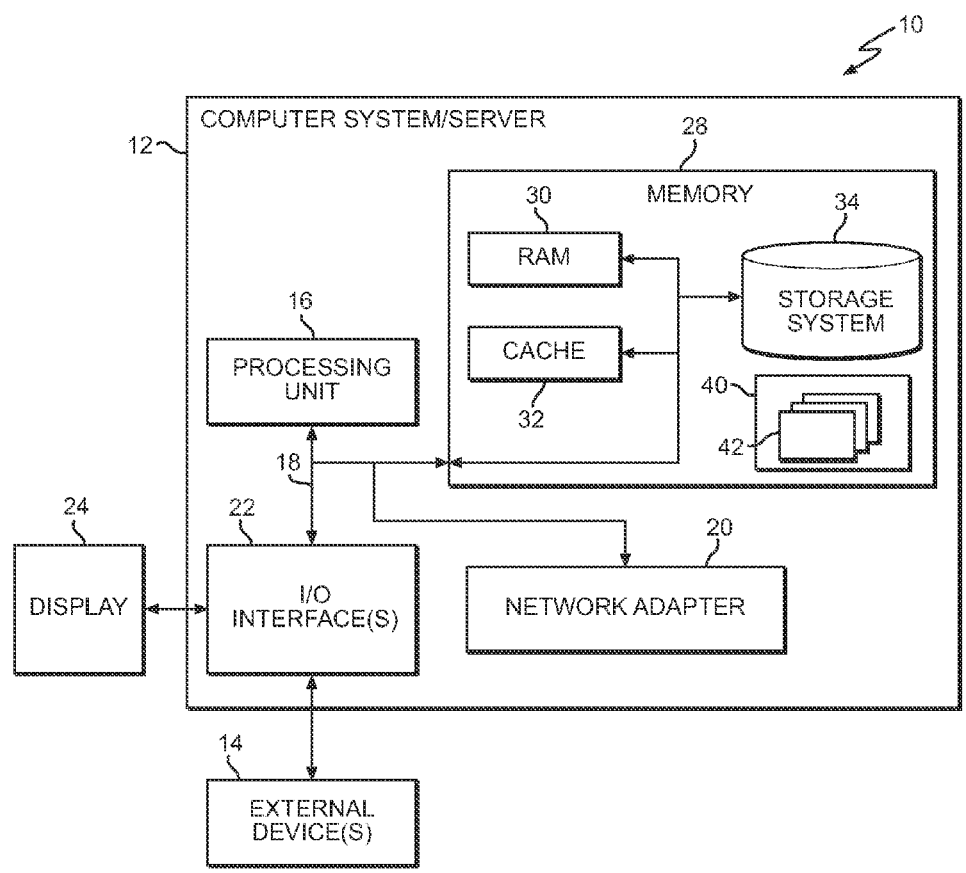
FIG. 1 depicts a computing infrastructure according to an embodiment of the present invention.

The present invention relates generally to a computer-based display resolution configuration, and, more particularly, to methods and systems for optimizing electronic display resolutions. Implementations of the present invention can be used to reduce unnecessary consumption of streaming data. In embodiments, data consumption is reduced in media streaming by analyzing user viewing conditions which would not benefit from higher quality media streams and programmatically lowering those streams accordingly. In embodiments, a system is configured to detect a viewer's distance and angle from the display device, when a viewer is no longer in the vicinity of the display device, the level of attention of viewers (i.e. the user is looking at an interacting with a tablet instead of a television), and when a media application (e.g., browser window for a video rental company) has lost focus and is partially or completely obscured by another window. In embodiments, the system is configured to determine an ideal streaming resolution, and automatically modify the incoming stream to match the ideal stream. Optionally, the system can adjust to just the audio over the network (leaving out the video). In implementing embodiments, there is no discernible change in the user experience while reducing Internet traffic and potentially reducing any utility charges for Internet data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
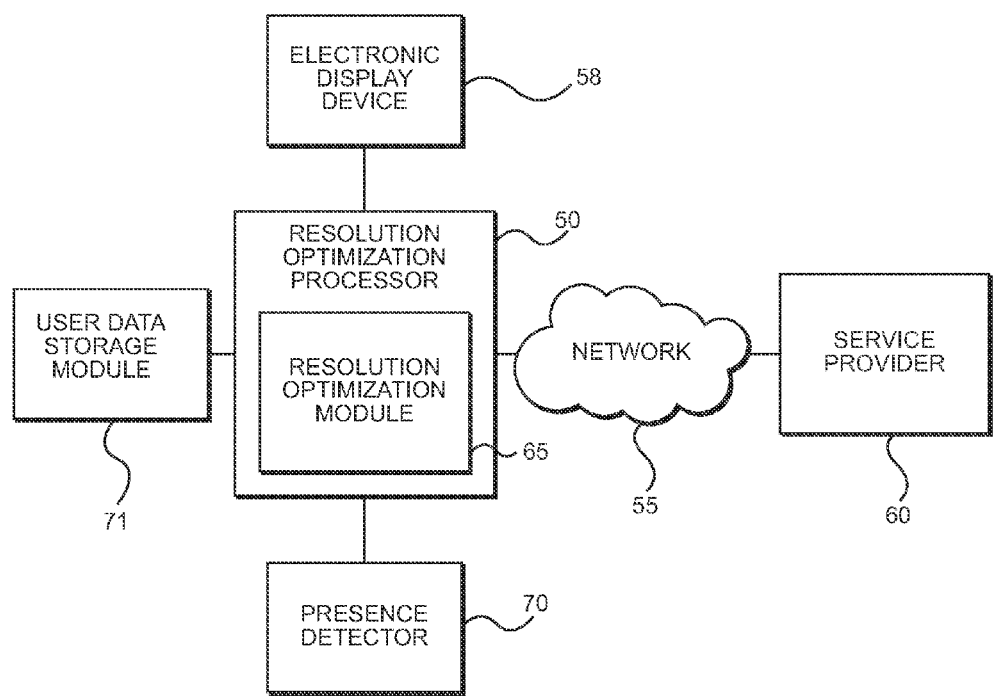
FIG. 2 shows an exemplary environment in accordance with aspects of the invention.

FIG. 2 shows an exemplary environment in accordance with aspects of the invention. The environment includes a resolution optimization processor 50 connected to a network 55. Resolution optimization processor 50 may comprise a computer system 12 of FIG. 1, and may be connected to network 55 via network adapter 20 of FIG. 1. Resolution optimization processor 50 may be configured as a special purpose computing device that is part of the infrastructure of an electronic display device 58. For example, resolution optimization processor 50 may be configured to communicate with a service provider 60 to receive streaming data from the service provider, and to coordinate the quality of streaming data received from the service provider to the electronic display device 58. A presence detector 70 and a user data storage module 71 are shown in communication with resolution optimization processor 50. Presence detector 70 may be configured as part of a special purpose computing device that is part of the infrastructure of electronic display device 58. Data storage module 71 may comprise cache memory 32 and/or storage 34 of computer 12.

Network 55 may be any suitable communication network or combination of networks, such as a local area network (LAN), a general wide area network (WAN), and/or a public network (e.g., the Internet).

Still referring to FIG. 2, a resolution optimization module 65 of resolution optimization processor 50 is configured to perform one or more of the functions described herein. Resolution optimization module 65 may include one or more program modules (e.g., program module 42 of FIG. 1) executed by resolution optimization processor 50. In embodiments, resolution optimization module 65 is configured to implement a test sequence to gather user preference data and determine a user's personalized optimal resolution for a particular location. Personalized optimal resolutions reflect a user's unique viewing experience, and may be affected by a user's visual acuity, a user's physical limitations, the layout of a particular viewing location (e.g., the location of a user's couch with respect to an electronic display device 58), other factors and combinations thereof. In embodiments, resolution optimization module 65 is configured to detect the identity of at least one user, and adjust the resolution of electronic display device 58 based on the at least one user's personalized optimal resolution data. Additionally, resolution optimization module 65 may be configured to adjust the resolution of electronic display device 58 based on the location of at least one user with respect to electronic display device 58. Resolution optimization module 65 may also be configured to adjust the resolution of an image frame displayed by electronic display device 58 based on the priority level of the image frame. In aspects, the resolution optimization module 65 is configured to cooperate with service provider 60 to optimize the resolution of electronic display device 58.

Figure 3:
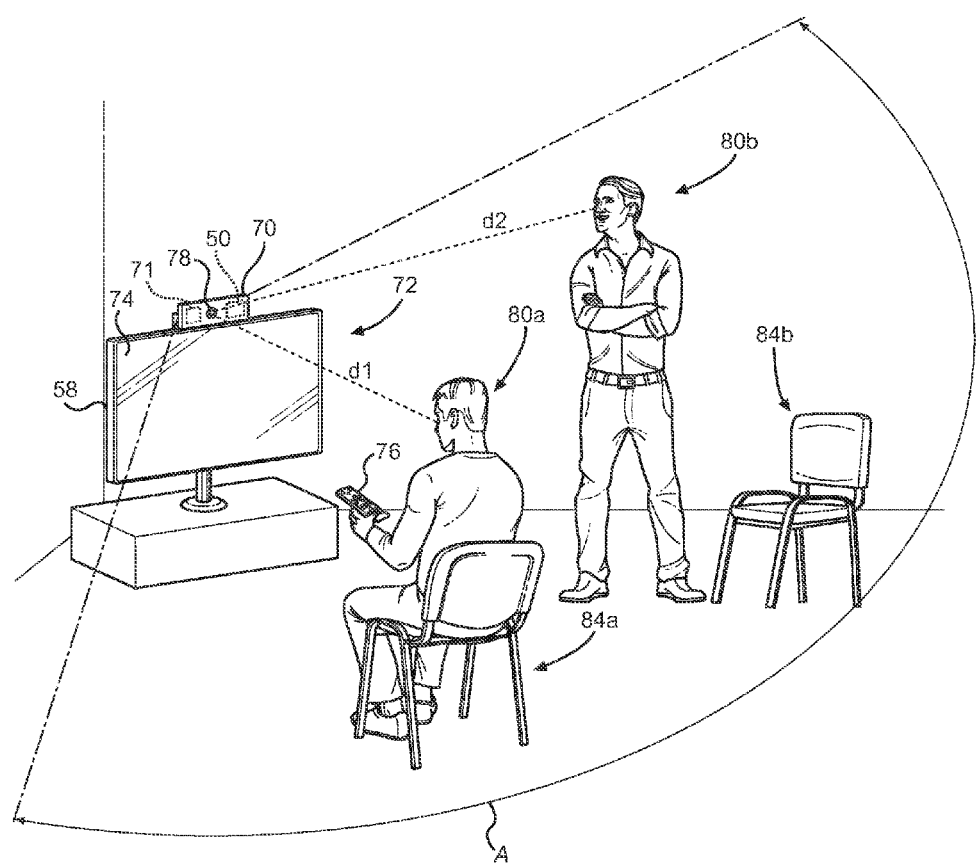
FIG. 3 shows an exemplary system in accordance with aspects of the invention.

FIG. 3 shows an exemplary resolution optimization system 72 comprising resolution optimization processor 50, an electronic display device 58 including a display 74, presence detector 70, user data storage module 71, and a user interface 76. Electronic display device 58 is shown as a networked television, but may be any stationary or mobile device configured to receive streams of data for visual display, such as a telephone, a personal digital assistant, a tablet computer, a laptop computer, or the like. Presence detector 70 is depicted as a set-top box incorporating resolution optimization processor 50 and data storage module 71, with the set-top box being separate from but in communication with electronic display device 58. In alternative embodiments, presence detector 70 may be incorporated into a television, a computer, a mobile phone, a personal digital assistant, an analog/digital recorder, a CD/DVD player/recorder, audio equipment, an existing motion sensing input device (e.g., Kinect™) or any other consumer electronic device. Presence detector 70 includes at least one sensor 78, which may be comprised of one or more motion sensors, heat sensors, proximity sensors, light sensors or other devices for detecting a presence and location of one or more users (e.g., 80*a*, 80*b*). In embodiments, presence detector 70 is further configured to determine a distance d (e.g., $d_1$, $d_2$) of the one or more users from presence detector 70 and/or electronic display device 58.

Facial recognition software may be utilized by system 72 in a conventional manner to gather user identification data. User identification data for one or more users is stored by resolution optimization module 65 in user data storage module 71. Any suitable facial recognition software can be adapted for use with aspects of the present invention. Presence detector 70 preferably works in conjunction with facial recognition software to enable system 72 to detect the identity of one or more users (e.g., 80*a*, 80*b*), by accessing the stored user identification data in module 71.

System 72 is configured to perform one or more test sequencing to gather personalized optimal resolution data for a particular user (e.g., 80*a*, 80*b*) at a particular test location (e.g., 84*a*, 84*b*). User interface 76 enables a user to interact with resolution optimization processor 50 during a test sequence. User interface 76 is depicted as a remote television controller in FIG. 3, but can take a variety of forms, such as an electronic device button, a keypad, a touch screen, or other devices enabling a user to communicate with resolution optimization processor 50.

Figure 4:
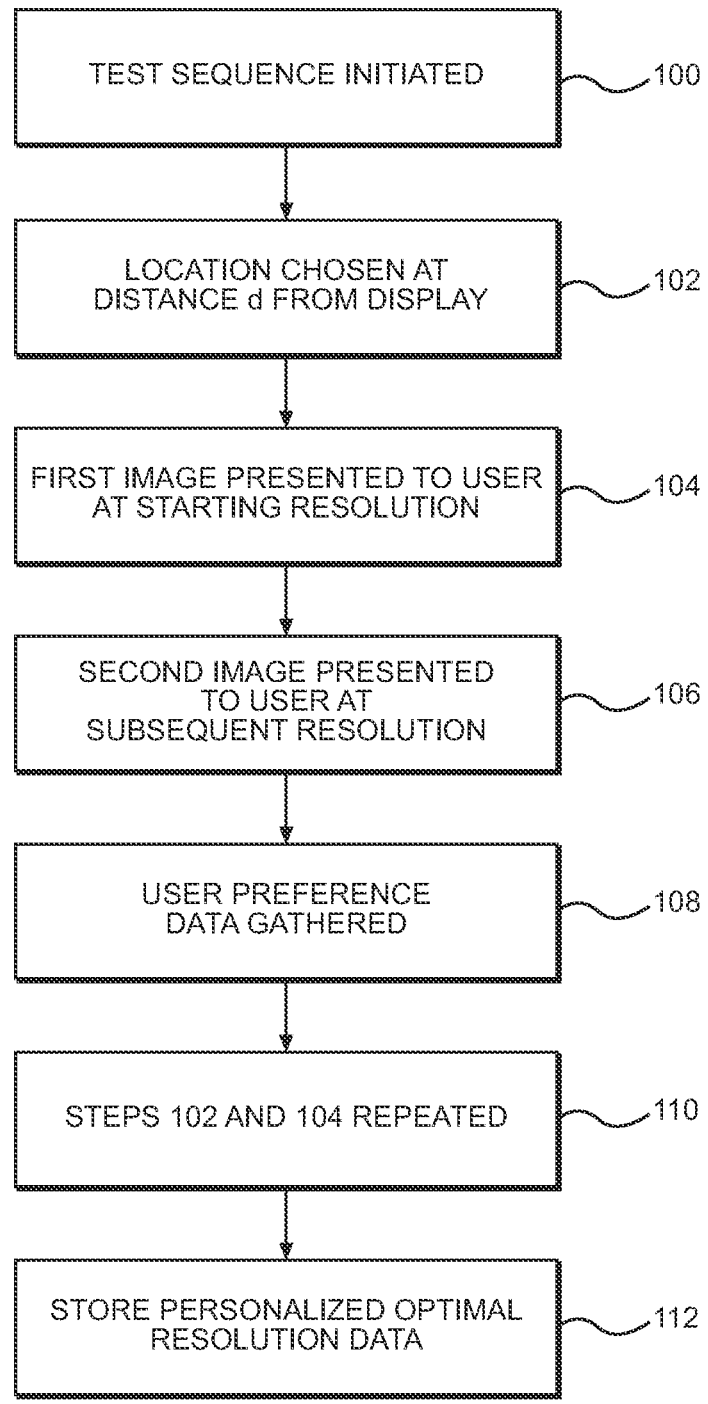
FIG. 4 shows a flowchart of steps of a method in accordance with aspects of the invention.

FIG. 4 shows a flowchart of a method in accordance with aspects of the invention. Steps of the method of FIG. 4 may be performed in the environment illustrated in FIGS. 2 and 3, and are described with reference to elements shown in FIGS. 2 and 3. At step 100 a test sequence is initiated by a user or by resolution optimization module 65 of system 72. By way of example, a user 80*a* can push a sequence of buttons on user interface 76 to access a test sequence program of resolution optimization processor 50. Alternatively, system 72 can initiate a test sequence upon receiving a test sequence initiation signal, such as a signal from service provider 60. Once initiated, at step 102 the test sequence instructs user 80*a* to choose a test location (i.e., 84*a*, 84*b*). Thereafter, at step 104 system 72 will cause display 74 to present an image to user 80*a* for a predetermined period of time, wherein the image has a first, starting resolution. The starting resolution can be a predetermined resolution, such as the maximum resolution possible for display 74, or may be a resolution calculated based on the user's position with respect to system 72. For example, conventional calculations may be used for determining a resolution that is lower than the maximum possible resolution of a display, but that is likely to be perceived by a user as the same as the maximum resolution. Such calculations are based on a user's distance from display 74, the user's viewing angle with respect to display 74, and the average pixel size (which varies with screen size) of display 74. In embodiments, system 72 gathers the data and performs calculations to determine a starting resolution likely to be perceived by user 80*a* as a quality image.

After the predetermined period of time, at step 106 system 72 will cause display 74 to present the image to user (e.g., 80*a* or 80*b*) at a second or subsequent resolution. The second resolution may be a higher resolution, a lower resolution or may be the same resolution as the starting resolution. At step 108, system 72 gathers the preferences of user 80*a* regarding the starting resolution and the subsequent resolution. For example, system 72 may ask user 80*a* if the image was clearer at the starting resolution, or clearer at the subsequent resolution. User 80*a* may then respond using user interface 76. For example, system 72 may instruct user 80*a* to push a first button on the user interface if the starting image was clearer, push a second button on the user interface if the subsequent image was clearer, or push a third button on the user interface if user 80*a* sees no difference between the starting image presentation and subsequent image presentation. At step 110, system 72 may repeat steps 102 and 104 any number of times using different resolutions to obtain a sufficient amount of user preference data for resolution optimization module 65 to determine a personalized optimal resolution for user 80*a* at the particular test location. For example, the test sequence may be repeated until user 80*a* twice indicates that a presentation of an image at a particular resolution is the clearest image presentation (where the particular resolution is a lower resolution than the maximum possible resolution of display 74). At step 112, system 72 stores this personalized optimal resolution data with user identification data and test location (i.e. recorded test location) data in user data storage module 71. User identification data may include facial recognition data gathered by presence detector 70, user identification data entered into system 72 by a user, user identification data gathered by system 72 from service provider 60, or any combination of the above.

The test sequence may be repeated for user 80*a* at different test locations with respect to display 74, or may be repeated for additional users (e.g., user 80*b*). For each user 80*a*, 80*b*, personalized optimal resolution data is associated with relevant user identification data, and is stored by system 72 in user data storage module 71. Based on the discussion above, it should be readily understood that the test sequence enables system 72 to determine a resolution at which a user will be provided a quality viewing experience while reducing the use of unnecessarily high image resolutions. Further, in embodiments of the present invention, resolution optimization module 65 is able to determine a user's personalized optimal resolution for particular test locations based on only user preference data, and without having to know a user's distance from display 74, the user's viewing angle with respect to display 74, the average pixel size of display 74, or user characteristics, such as visual acuity of the user.

Figure 5:
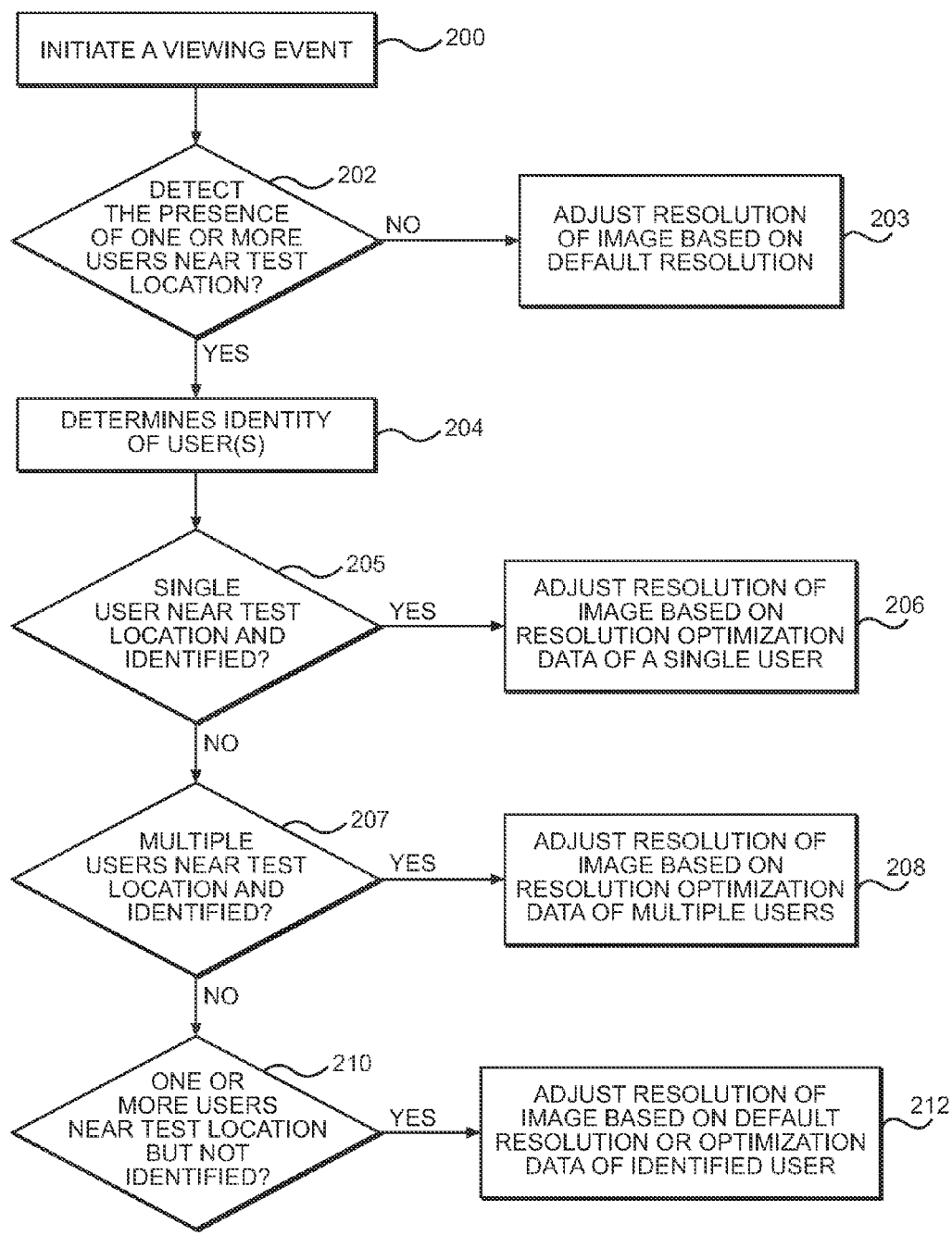
FIG. 5 shows a flowchart of steps of a method in accordance with aspects of the invention.

FIG. 5 will now be discussed in reference to the manner in which test sequence data may be utilized by system 72 to provide optimal viewing experiences for one or more users (e.g., 80a, 80b) with minimal resolution requirements. At step 200, an image viewing event utilizing an electronic display device, such as television 58, is initiated by one or more users. A viewing event can be initiated in any conventional manner, such as by turning on electronic display device 58. At step 202, presence detector 70 detects the presence of one or more users (e.g., 80a, 80b) within a predetermined distance from a recorded test location within a predetermined area A. Detecting the presence of one or more users includes detecting the actual location of the one or more users within the predetermined area A. The predetermined distance can be the actual recorded test location, or any actual location near the test location. The actual location can be a specific location, or a general location, such as the entire seating surface of a couch or chair (e.g., 84a, 84b). Predetermined area A can be based on physical detection limits of one or more sensors 78 within presence detector 70, the size of a particular room or section of a room, or other limiting factors. If no users are detected within a predetermined distance of a test location at step 202, system 72 may default to a predetermined resolution setting at step 203. The predetermined resolution setting can be the maximum resolution allowed by display 74, a resolution lower than the maximum resolution allowed by display 74, or a resolution of zero (i.e. no image is displayed).

If one or more users are detected at an actual location within a predetermined distance from a recorded test location at step 202, resolution optimization module 65 accesses user data storage module 71 and determines the identity, if known, of the user(s) at step 204. The identity of the user(s) may be determined, for example, using facial recognition software in a conventional manner. At step 205, if only a single user (e.g., 80a) is detected and the identity of the user is known, resolution optimization module 65 adjusts the resolution of the image displayed by electronic display device 58 based on personalized optimal resolution data associated with user 80a at step 206. In embodiments, resolution optimization module 65 determines the actual location of the user and selects the personalized optimal resolution data associated with a test location that is closest to the actual location of the user. Optionally, if the user is detected at an actual location that is not within a predetermined distance of a test location associated with stored personal optimal visual resolution data, resolution optimization module 65 may cause display 74 to display an image(s) at a default resolution at step 203, such as the maximum resolution allowed by display 74, or a resolution lower than the maximum resolution allowed by display 74. At step 207, when presence detector 70 determines that more than one user (e.g., 80a and 80b) is within area A, and the identity of the users is known, resolution optimization module 65 adjusts the resolution of the image displayed by electronic display device 58 based on the personalized resolution optimization data, associated with the users' identities at step 208. In an exemplary embodiment, step 208 constitutes selecting the optimal resolution for user 80a, which is higher than the optimal resolution for user 80b, and adjusting the resolution of the image displayed based on the higher resolution. If the actual location of one of the users (e.g., 80b) is not within a predetermined distance of a stored test location associated with stored personal optimal visual resolution data, resolution optimization module 65 may select a default resolution for user 80b, such as the maximum resolution allowed by display 74, or a resolution lower than the maximum resolution allowed by display 74. Resolution optimization module 65 may then compare the optimal resolutions of the users to determine which is the highest optimal resolution. Thereafter, resolution optimization module 65 may cause display 74 to display images at the highest optimal resolution.

At step 210, if one or more users are present, but resolution optimization module 65 determines that the identity of any one of the users is unknown, then system 72 may adjust the resolution of an image based on a default resolution at step 212. For example, resolution optimization module 65 may utilize calculations to determine a generalized optimal resolution based on the closest user's distance from display 74, the user's viewing angle with respect to display 74, and the average pixel size of display 74. Alternatively, system 72 may default to the highest viewing resolution or a preselected intermediate viewing resolution below the highest viewing resolution. Alternatively at step 212, when at least one of the multiple users is identified, resolution optimization module 65 may adjust the resolution of the image displayed by electronic display device 58 based on the personalized resolution optimization data associated with the identified user(s).

In embodiments, if presence detector 70 senses a change in actual location of one or more users during an image viewing event, resolution optimization module 65 accesses user data storage module 71 and adjusts the resolution of the image displayed by electronic display device 58 based on personalized optimal resolution data associated with the new location(s). Optionally, resolution optimization module 65 may be programmed to wait a predetermined period of time after one or more user's change locations before adjusting the resolution of the image. If the one or more users return to the first location(s) or move to yet another location(s) during the predetermined period of time, resolution optimization module 65 will refrain from adjusting the resolution of the image until the one or more users have been in the same location for the predetermined period of time.

Based on the discussion of system 72 above, it can be understood that a personalized optimal resolution of a user may be a resolution that is lower than the highest possible resolution of the electronic display device 58. Accordingly, system 72 will cause the resolution of an image on display 74 to be degraded or lowered, while maintaining the user's perceived image quality during an image viewing event. In this way, the bandwidth utilized by an incoming data stream can be reduced. In embodiments, system 72 communicates instructions to service provider 60 to degrade the stream of data being received by service provider 60, based on personalized optimal resolution data.

Figure 6:
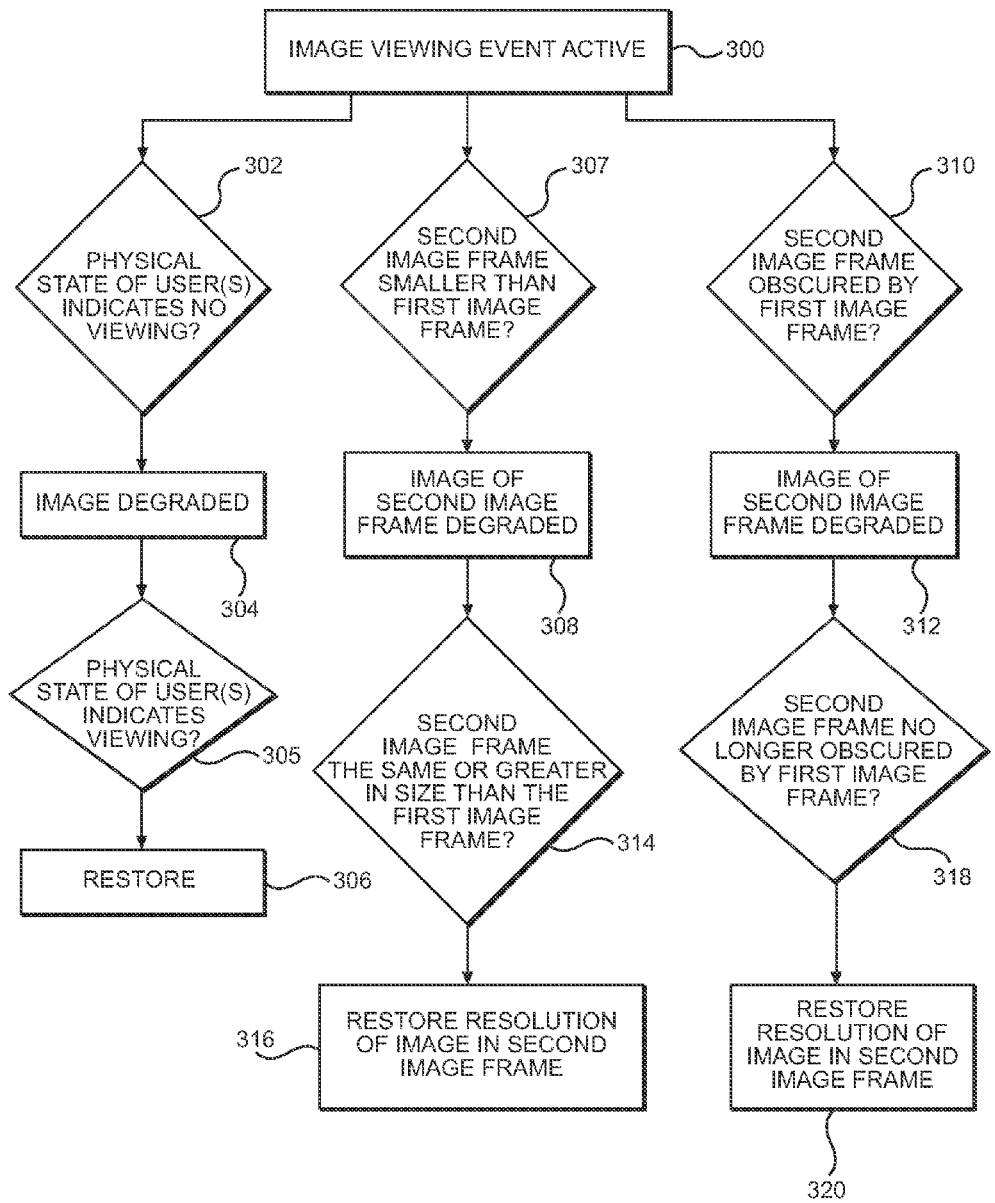
FIG. 6 shows a flowchart of steps of a method in accordance with aspects of the invention.

FIG. 6 will now be referenced with respect to additional methods of optimization that can be utilized by system 72 to further reduce the unnecessary consumption of bandwidth, during a viewing event 300. In embodiments, presence detector 70 senses when a user's physical state indicates that they are not viewing electronic display device 58, such as when one or more users have moved out of a predefined area A. At step 302, when one or more users' physical state indicates that electronic display device 58 is not being viewed, resolution optimization module 65 may cause the image displayed on display 74 to degrade at step 304. For example, when no users are present within area A for a predetermined time period, when no users are facing display 74 for a predetermined time period, or when one or more users present have their eyes closed for a predetermined time period, resolution optimization module 65 may cause the image displayed on display 74 to degrade at step 304.

Degradation of the image may be in the form of a lower resolution, or resolution optimization module 65 may cause the display 74 to cease displaying the image. Optionally, audio from electronic display device 58 may still be active while display 74 is blank, or inactive. At step 305, if presence detector 70 senses that the physical state of one or more users indicates that they are viewing display 74, then resolution optimization module 65 will cause display 74 to restore the resolution of the image to a higher resolution at step 306. For example, when one or more users have returned to predefined area A, then resolution optimization module 65 will cause display 74 to restore the resolution of the image to a higher resolution at step 306. The restored resolution may be based on personalized optimal resolution data in accordance with any of the steps above.

In other embodiments, resolution optimization module 65 is programmed to sense when a first image frame has lost "focus" and therefore has a lower priority than a second image frame. Resolution optimization module 65 will then cause the resolution of the lower priority image frame to be degraded. By way of example, a user may be watching a frame-in-frame video, wherein a football game is viewable in a first image frame and a weather program is viewable in a second, smaller, image frame. Resolution optimization module 65 may be programmed to sense that the second image frame is smaller in size than the first image frame at step 307, and may degrade the resolution of the image in the second image frame at step 308. The degradation can be based on a predetermined resolution, or may be based on conventional calculations to determine a lowest resolution at which the user cannot perceive a difference in viewing quality. If resolution optimization module 65 senses that the second image frame is no longer at a lower priority, then resolution of the image therein may be restored. For example, at step 314, if a second image frame is determined to be the same size or a greater size than the first image frame, the resolution of the second image frame may be restored to a higher resolution at step 316. By way of another example, resolution optimization module 65 may be programmed to sense when a first image frame is caused to obscure a second image frame from view at step 310. At step 312, when the second image frame is obscured for a predetermined time period, resolution optimization module 65 may cause the image in the second image frame to be degraded to a lower resolution (including turning off the image completely). Optionally, audio associated with the second image frame may still be active while the degraded image (or no image) displays in the second image frame. At step 318, if resolution optimization module 65 senses that second image frame is no longer obscured by the first image frame, then the resolution of the second image frame may be restored to a higher resolution at step 320.

In embodiments, a service provider, such as a steaming video provider, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for optimizing resolution of an electronic device display. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for optimizing display resolution of an electronic device, the computer program product comprising a computer readable storage medium having program instructions embodied therewith, the program instructions being executable by a computing device to cause the computing device to:
   implement a test sequence to determine optimal resolution of an electronic device display at a test location including:
      display an image to a user on the electronic device display at a first resolution;
      display the image to the user on the electronic device display at a second resolution different from the first resolution;
      gather user preference data regarding the first resolution and the second resolution to determine a personalized optimal resolution for the test location;
      save said personalized optimal resolution in a user data storage module;
   repeat the step of implementing the test sequence for additional test locations, such that user preference data is gathered for the additional test locations;
   determine a personalized optimal resolution for each of the additional test locations; and
   save user identification data and test location data for each of the test locations, wherein the user identification data and test location data is saved with the personalized optimal resolution for each of the respective test locations;
   detect the presence of the user relative to the electronic device display;
   determine an identity of the user;
   obtain, from the user data storage module, personalized optimal resolution data of the user; and
   adjust a resolution of the electronic device display to a desired resolution based on only the personalized optimal resolution data.

2. The computer program product of claim 1, wherein implementing the test sequence further includes:
   repeat the steps of displaying the image to the user at additional resolutions; and repeat the step of gathering user preference data for the additional resolutions to determine the personalized optimal resolution.

3. The computer program product of claim 1, wherein implementing the test sequence further includes:
determine a distance between the electronic device display and the user; and
determine the first display resolution based on the distance.

4. The computer program product of claim 1, wherein the program instructions further cause the computing device to:
detect the presence of multiple users; and
determine the personalized optimal resolutions of the respective multiple users;
wherein adjusting the resolution comprises adjusting the resolution of the electronic device display based on the highest personalized optimal resolution.

5. The computer program product of claim 1, wherein the program instructions further cause the computing device to:
determine that a first image frame has lost focus and is thus a lower priority than a second image frame; and
adjust an image displayed in the first image frame from the desired resolution to a second, lower resolution.

6. The computer program product of claim 1, wherein the program instructions further cause the computing device to:
detect that the user has moved beyond a predetermined distance from the electronic device display; and
adjust the desired resolution of the electronic device display to a second, lower resolution.

7. The computer program product of claim 6, wherein the second, lower resolution is zero.

8. A computer-implemented method, comprising:
implementing a test sequence to determine optimal resolution of an electronic device display including:
displaying an image to a user on the electronic device display at a first resolution;
displaying the image to the user on the electronic device display at a second resolution different from the first resolution;
gathering user preference data regarding the first resolution and the second resolution to determine a personalized optimal resolution for a particular test location, where the particular test location is located at a distance from the electronic device display; and
storing the user preference data with test location data in a storage module;
wherein the step of implementing the test sequence is repeated for different test locations, such that user preference data is gathered for the different test locations, and user preference data is stored with test location data and user identification data in the storage module for each of the test locations.

9. The method of claim 8, wherein the steps of displaying the image to the user are repeated with additional resolutions, and the step of gathering user preference data is repeated for the additional resolutions in order to determine the personalized optimal resolution.

10. The method of claim 8, further comprising:
detecting the presence of at least one user;
determining an identity of the at least one user; and
adjusting the resolution of the electronic device display to the personalized optimal resolution based on the user preference data associated with the identified at least one user.

11. The method of claim 10, wherein the determining the presence of at least one user comprises detecting the presence of multiple users, and the method further comprises:
determining the personalized optimal resolutions of the respective multiple users;
wherein adjusting the resolution comprises adjusting the resolution of the electronic device display based on the highest personalized optimal resolution.

12. The method of claim 10, further comprising:
determining that a first image frame has a lower priority then a second image frame; and
adjusting an image displayed in the first image frame from the personalized optimal resolution to a second, lower resolution.

13. The method of claim 10, further comprising:
detecting that a physical state of the at least one user indicates that the electronic device display is not being viewed; and
adjusting the personalized optimal resolution of the electronic device display to a second, lower resolution.

14. The method of claim 13, wherein the second, lower resolution is zero.

15. The method of claim 8, further comprising:
determining a distance between the electronic device display and the user; and
determining the first display resolution based on the distance.

16. A system for optimizing display resolution of an electronic device, comprising:
a CPU, a computer readable memory and a computer readable storage medium associated with a computing device;
program instructions to implement a test sequence to determine a personalized optimal resolution of a user at multiple test locations at a distance from the electronic device display including:
gather test location data for one of the multiple test locations;
display an image to the user on the electronic device display at a first resolution;
display the image to the user on the electronic device display at a second resolution different from the first resolution;
gather the user preference data regarding the first resolution and the second resolution to determine the personalized optimal resolution for the one of the multiple test locations;
repeat the test sequence steps for each of the remaining multiple test locations, such that user preference data is gathered for each of the multiple locations; and
save the personalized optimal resolution for each of the multiple test locations, wherein user identification data and test location data is saved with the personalized optimal resolution for each of the multiple test locations;
program instructions to detect the presence of the user at or near one of the multiple test locations; and
program instructions to adjust a resolution of the electronic device display based on the personalized optimal resolution of the user;
wherein the program instructions are stored on the computer readable storage medium for execution by the CPU via the computer readable memory, and wherein the personalized optimal resolution is determined based only on user preference data.

\* \* \* \* \*